Patented Nov. 20, 1923.

1,474,928

UNITED STATES PATENT OFFICE.

GUILLAUME DE MONTMOLLIN AND JOSEF SPIELER, OF BASEL, SWITZERLAND, ASSIGNORS TO SOCIETY OF CHEMICAL INDUSTRY OF BASLE, OF BASEL, SWITZERLAND.

CARBONYL DERIVATIVES OF ALPHA NAPHTHOL AND PROCESS OF MAKING SAME.

No Drawing.    Application filed May 18, 1922.   Serial No. 561,920.

*To all whom it may concern:*

Be it known that we, GUILLAUME DE MONTMOLLIN and JOSEF SPIELER, both citizens of the Swiss Republic, and residents of Basel, Switzerland, have invented new and useful Carbonyl Derivatives of Alpha Naphthol and a Process of Making Same, of which the following is a full, clear, and exact specification.

In the specification of our U. S. Letters Patent No. 1,387,596 we have described a process for the manufacture of dyestuffs derived from trinaphthylmethane, consisting in reacting with a tetrahalogen derivative of methane on alpha naphthol in presence of substances capable of neutralizing acids.

We have now found that when the above process is carried out in presence of an aliphatic alcohol which contains not more than two atoms of carbon, there are obtained besides the said dyestuffs further new products, which can be isolated from the reaction mass owing to their solubility in the organic solvents and their behaviour toward bases and acids and correspond to the general formula

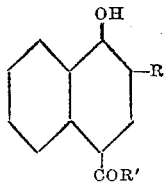

wherein R stands for an atom of hydrogen or a COO-alkyl radical and R¹ for an O-Alkyl-radical, the said new products being the esters of the 1-oxynaphthalene-4-carboxylic acid and of the 1-oxynaphthalene-2.4-dicarboxylic acid. According to the alcohol chosen, the formation of either of these substances can be favored. Thus, when the process is carried out in presence of methyl alcohol, there are obtained, besides the methyl ester of the 1-oxynaphthalene-4-carboxylic acid, large quantites of methyl ester of 1-oxynaphthalene-2.4-dicarboxylic acid, and in presence of ethyl alcohol there is obtained as main product of the reaction the ethyl ester of the 1-oxynaphthalene-4-carboxylic acid.

These new products can be employed for the manufacture of dyestuffs and of intermediary products for the manufacture of dyestuffs.

*Example 1.*

144 parts of alpha naphthol are dissolved in a mixture of 500 parts of soda lye (solution of caustic soda) of 40% and of 1200 parts of methyl alcohol. Then there are added 154 parts of carbon tetrachloride and 1 part of copper powder and the whole is stirred for several hours, while cooling in such a manner that the temperature does not rise over 50° C. The reaction being achieved, the intense blue-green liquid thus obtained is neutralized with a mineral acid. The methyl ester of 1-oxynaphthalene-2.4-dicarboxylic acid is thus precipitated in form of a slightly colored powder. It is separated by filtration and crystallized from acetic acid. Thus there are obtained uncolored crystals melting at 144° C. They dissolve relatively with difficulty in solutions of caustic soda and of sodium carbonate, do not combine with diazobenzene and give by saponification the 1-oxynaphthalene-2.4-dicarboxylic acid.

The methyl alcohol is distilled off from the liquid, from which the methyl ester of 1-oxynaphthalene-2.4-dicarboxylic acid was precipitated by acidifying, whereby the methyl ester of 1-oxynaphthalene-4-carboxylic acid is precipitated. This latter ester is crystallized from methyl alcohol. It constitutes lustrous crystals, nearly uncolored, melting at 178° C., which are easily soluble in hot dilute solutions of caustic soda and of sodium carbonate. It gives by saponification the 1-oxynaphthalene-4-carboxylic acid melting at 183–184° C., and described by Heller in the Berichte der Deutschen Chemischen Gesellschaft, vol. 45, page 675.

An analogous result is obtained by working in presence of absolute methyl alcohol.

*Example 2.*

144 parts of alpha naphthol are dissolved in a mixture of 400 parts of a solution of caustic soda of 40% and of 1200 parts of ethyl alcohol. Then there are added 154 parts of carbon tetrachloride and 1 part of copper powder and the whole is stirred for several hours, while cooling in such a manner that the temperature of the mass of reaction does not rise over 50° C. After the achievement of the reaction, the intense blue-green liquid is acidified with a mineral acid, the inorganic salts precipitated are filtered off and the alcohol is distilled off.

The residue thus obtained is digested with a hot dilute solution of sodium carbonate and the liquid is decanted after cooling. The residue, crystallized from alcohol, represents the ethyl ester of 1-oxynaphthalene-4-carboxylic acid in form of nearly uncolored crystals melting at 134° C.

What we claim is:

1. The herein described process for the manufacture of carbonyl derivatives of alpha naphthol corresponding to the general formula

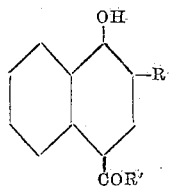

wherein R stands for an atom of hydrogen or a COO-alkyl radical and R' for an O-alkyl radical, consisting in reacting with a tetrahalogen derivative of methane on alphanaphthol in presence of substances capable of neutralizing acids and of an alcohol which contains not more than two atoms of carbon and isolating the carbonyl derivatives thus formed from the mass of reaction.

2. As new articles of manufacture the herein described esters of the 1-oxynaphthalene-4-carboxylic acid corresponding to the general formula:

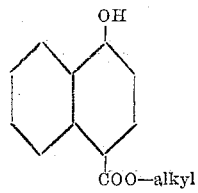

constituting nearly uncolored crystals insoluble in water, easily soluble in alcohol and in aqueous solutions of caustic alkalies which, treated with saponifying agents, may be transformed into 1-oxynaphthalene-4-carboxylic acid.

In witness whereof we have hereunto signed our names this 5th day of May, 1922, in the presence of two subscribing witnesses.

GUILLAUME DE MONTMOLLIN.
JOSEF SPIELER.

Witnesses:
JULIA DURST,
AMAND RITTER.